J. E. GREENAWALT.
GRATE FOR SINTERING PANS.
APPLICATION FILED NOV. 9, 1920.
1,388,334.
Patented Aug. 23, 1921.
4 SHEETS—SHEET 3.
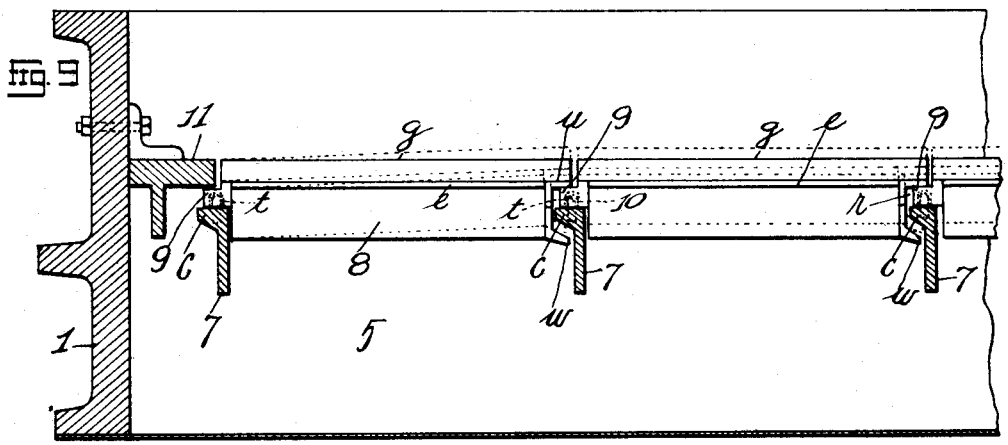
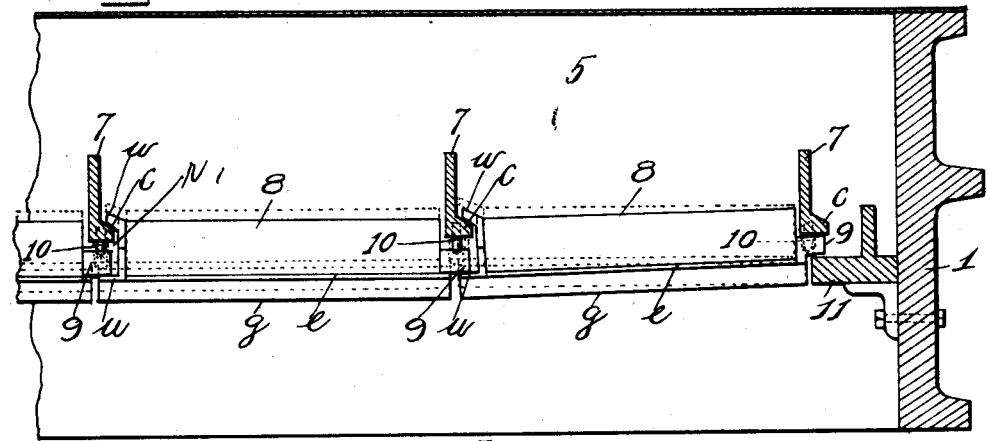
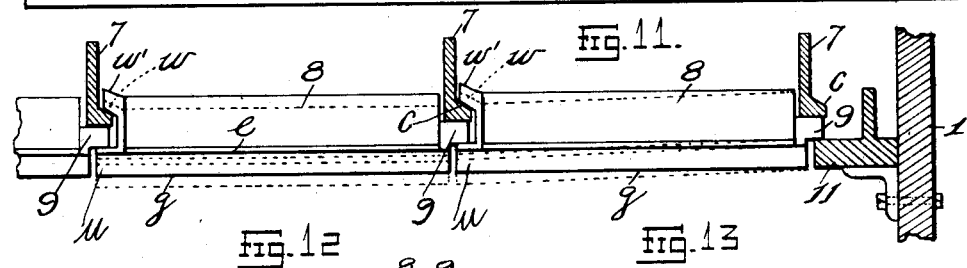
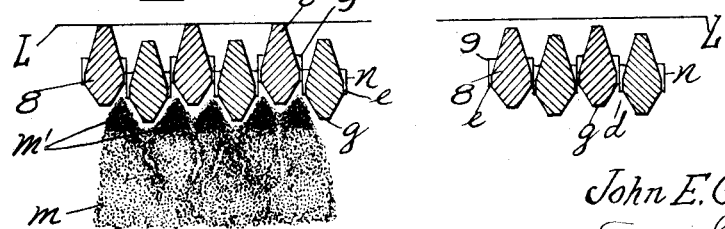
Inventor
John E. Greenawalt
by Emil Starek Atty.

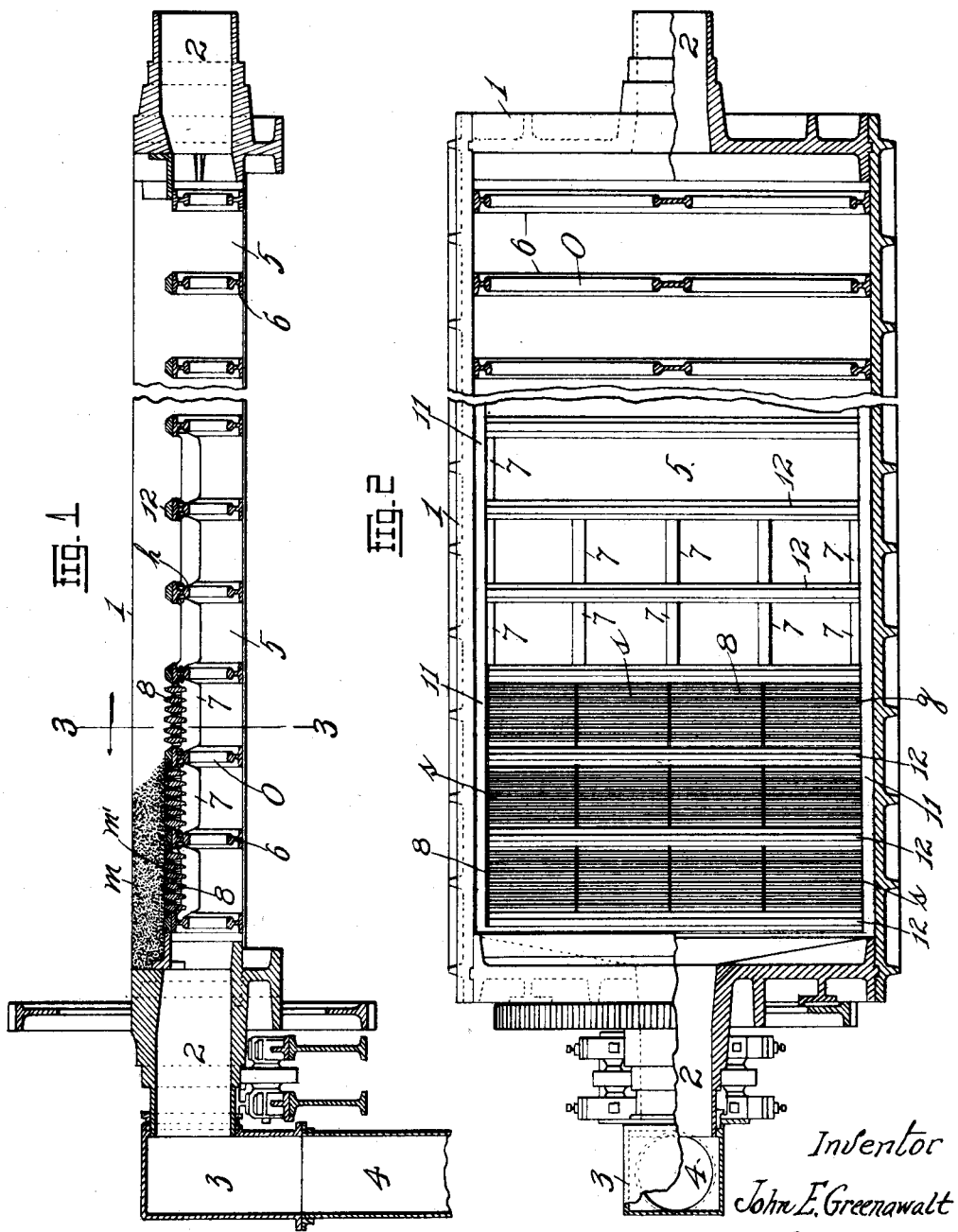

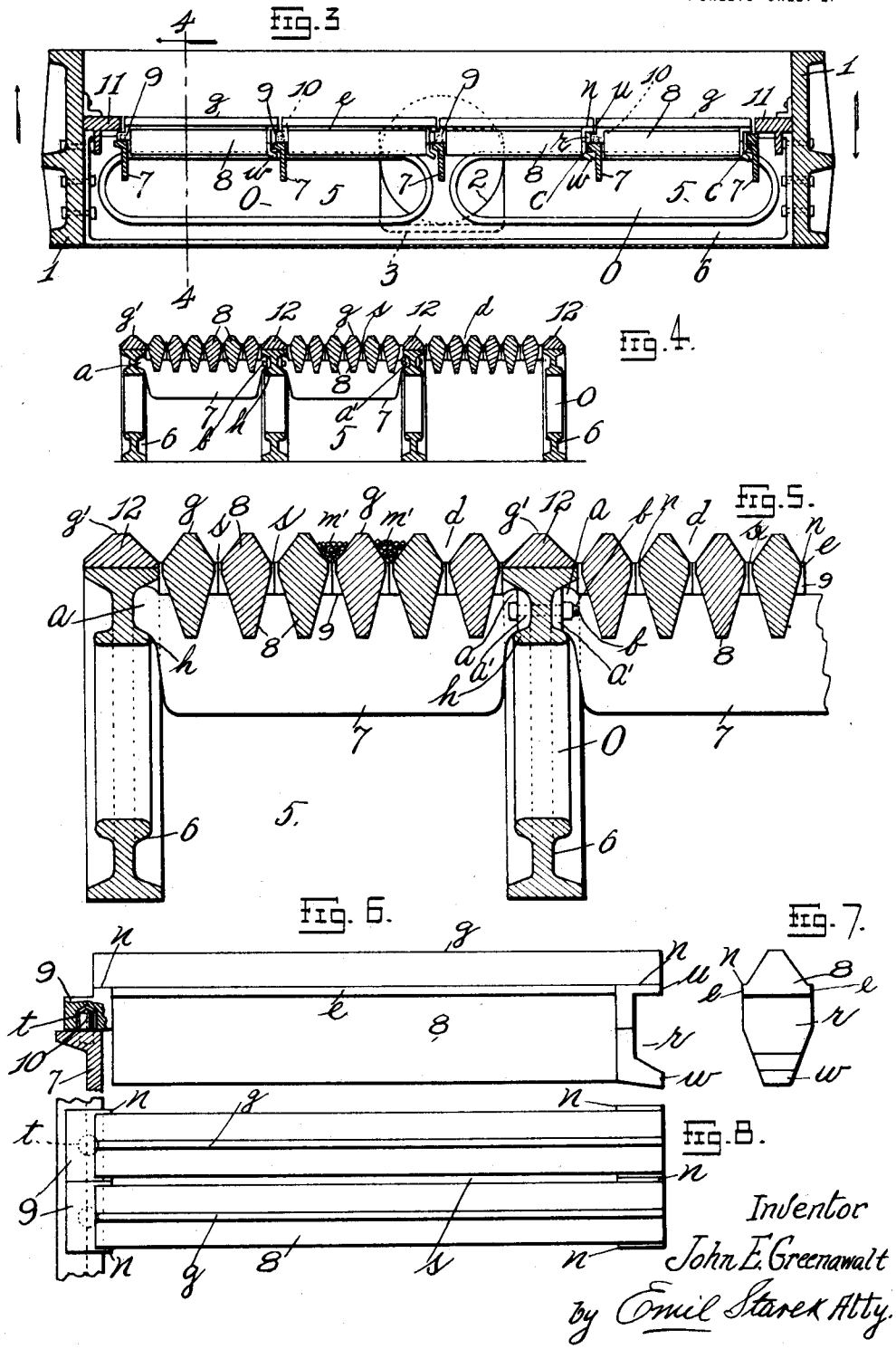

J. E. GREENAWALT.
GRATE FOR SINTERING PANS.
APPLICATION FILED NOV. 9, 1920.
1,388,334.
Patented Aug. 23, 1921.
4 SHEETS—SHEET 4.
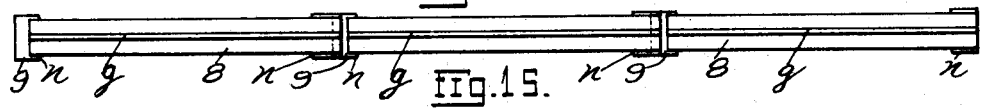
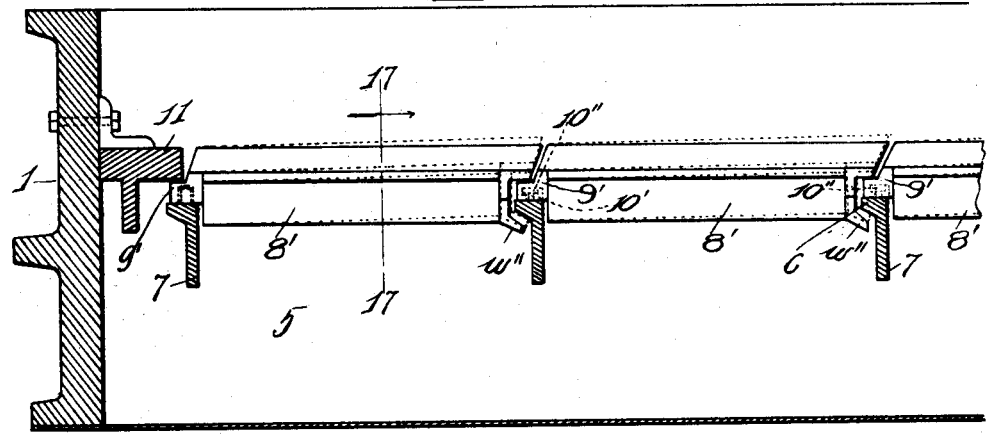
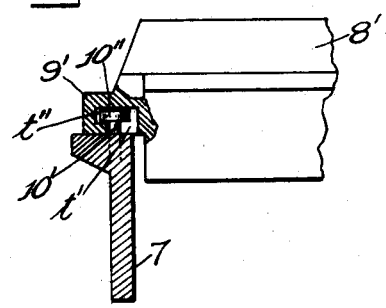
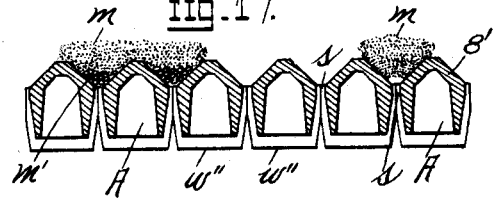
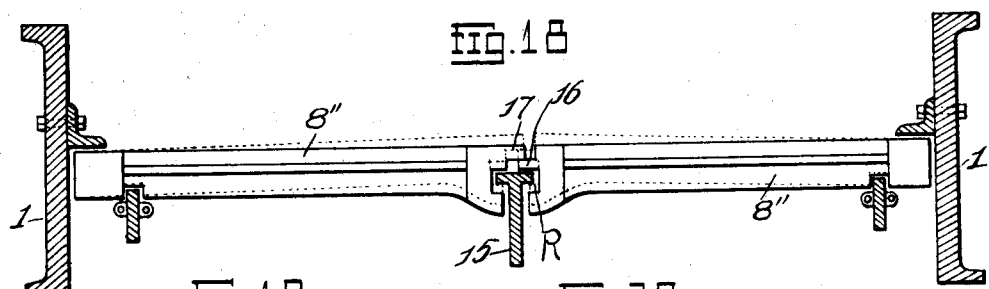
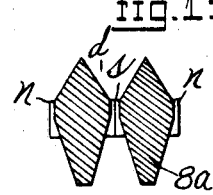
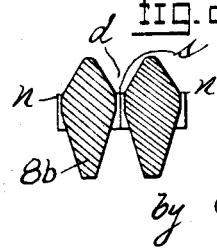
Inventor
John E. Greenawalt
by Emil Starek Atty.

UNITED STATES PATENT OFFICE.

JOHN E. GREENAWALT, OF NEW YORK, N. Y.

GRATE FOR SINTERING-PANS.

1,388,334.  Specification of Letters Patent.  Patented Aug. 23, 1921.

Application filed November 9, 1920. Serial No. 422,800.

*To all whom it may concern:*

Be it known that I, JOHN E. GREENAWALT, a citizen of the United States, residing at New York, in the county of New York and State of New York, have invented certain new and useful Improvements in Grates for Sintering-Pans, of which the following is a full, clear, and exact description, reference being had to the accompanying drawings, forming a part hereof.

The present invention is directed to improvements in grates for ore-sintering or roasting pans in which the charge supported by the grate is subjected to the action of a downdraft current of air to supply the oxygen to the combustible components of the charge, examples of which may be found in my U. S. Patents Nos. 1,098,035 and 1,110,623, bearing dates respectively May 26, 1914, and September 15, 1914, though obviously I do not wish to be restricted in the application of the invention to ore-sintering apparatus, or to sintering apparatus of any particular type, it being apparent that the grate has a wide range of uses and may be applied in any relation where it can subserve its legitimate and natural function. The improved grate however has special application in downdraft sintering pans in which, with grates as ordinarily constructed, considerable difficulty is encountered in maintaining open channels or paths for the passage of the gases, especially at the surface from which the gases escape. One of the methods resorted to for maintaining a clear and unobstructed passage through the openings of the grate is to interpose between the charge of ore to be sintered and the supporting surface of the grate a protecting layer of course porous inert material such as limestone, said protecting layer forming in effect a porous bed or hearth on which the charge to be sintered is directly supported. Ordinarily, this layer of inert material resting directly on the grate not only prevents the fine material composing the top layer or charge to be treated from being drawn through the openings or slots of the grate, but is itself susceptible of ready removal from the grate. It also permits of an even flow of gases through all portions of the grate surface, thereby producing a uniform product. However, in downdraft sintering the high temperature attained in the treatment of some material is so great that considerable portions of the material pass beyond the stage of incipient fusion and become molten, or sufficiently fluent to percolate through the channels and interstices of the inert porous protecting layer deposited on the grate, the molten material finally finding its way into the grate openings where it chills and clogs the openings and becomes fastened or adheres to the grate. To remove this adhering material from the ordinary grate, it becomes necessary to employ manual labor and much time is consumed in cleaning the grate and restoring the same to working condition. Of course, by employing a protecting layer or bedding of sufficient thickness the difficulties alluded to may be avoided; but since this bedding is usually limestone or previously sintered material composed of pieces from one-quarter to one-half inch in size and requiring special preparation, it is obvious that as a matter of economy it is desirable to employ a minimum amount thereof; and one of the objects of the present improvement is to reduce to a minimum the quantity of the material forming this bottom or protecting layer. This is accomplished by concentrating the material above the perforations or openings of the improved grate in such a manner as to not only fully protect the openings but at the same time form a layer presenting an innumerable number of passages for the traverse of the gases from the superincumbent fine material composing the charge to be treated or sintered. With the material forming the protecting bed or layer thus applied, the grate openings are given the greatest amount of protection with a minimum quantity of porous bedding spread over the grate. To further overcome the difficulties attending the use of grates as now generally constructed, the present improvement provides means for automatically removing any accretions on the grate or any obstructions in the grate openings, such removal being accomplished by imparting preferably to a portion of the grate bars a definite range of movement or displacement from their normal positions of rest with the rotation of the pan to dumping position, the bars resuming their original or normal positions when the pan is righted or turned back to its normal position. In this connection it may be stated that at the time of dumping the pan, the sintered material has slightly cooled and when cooled it becomes very brittle, so that a slight movement of a grate-bar is usually sufficient to loosen any material adhering thereto and to adjacent bars, and when the pan is dumped the loosened sinter will drop from the grate leaving the latter and its openings clean and ready for the next charge without resorting to manual labor as will hereinafter more fully appear. A further object of the improvement is to so dispose the grate-bars and the slots separating the same relatively to the rotation plane of the pan (the plane in which the pan is rotated for purposes of dumping) as to cause the weight of the sintered mass to crush and loosen (or tend to crush and loosen) any accretions adhering to the grate. A further object is to so construct the individual grate-bars as to cause the gases in the chamber below the grate to exert a maximum cooling effect thereon, and at the same time form lines of weakness in the layer of sintered material deposited on the grate, thereby permitting a tenacious piece of sinter to be more readily broken up. A further object of the invention is to enhance the breaking and loosening action of the grate bars by a suitable provision for imparting to different bars different ranges or degrees of movement with the dumping of the pan, this differential movement or drop among the several bars more effectively breaking up the sintered material adhering to the grate, and hence more effectively cleaning the grate as will hereinafter more fully appear. A further object of the invention is to construct a grate, the bars of which will permit the protecting porous layer to be entirely dispensed with in many cases, especially when treating material not likely to run or become unduly sticky upon reaching a sintering temperature, the cooling effect of the gases in the chamber below the grate preventing the material from adhering to the grate to an objectionable degree. A further object is to provide a grate structure presenting further and other advantages more fully apparent from the following detailed description of the invention in connection with the accompanying drawings in which—

Figure 1 represents a middle vertical longitudinal section of an ore sintering pan showing one form of my invention, only a portion of the grate-bars being illustrated; Fig. 2 is a top plan of the pan and the grate-bars shown in Fig. 1; Fig. 3 is an enlarged vertical cross-section of the pan on the line 3—3 of Fig. 1; Fig. 4 is a vertical transverse section through the grate-bars and the cross tie-beams carrying the grate supports, on the line 4—4 of Fig. 3; Fig. 5 is a sectional view corresponding to Fig. 4 but on a larger scale; Fig. 6 is a side elevation of one of the grate-bars, parts being broken away; Fig. 7 is an end view of the grate-bar looking toward the left on Fig. 6; Fig. 8 is a plan of two grate-bars in operating or normal position; Fig. 9 is a vertical cross-sectional detail through the side wall of the pan and three consecutive grate supports in upright position showing the support and interlocking of the grate-bars, the latter being in their normal positions of rest; Fig. 10 is a view of the parts shown in Fig. 9 with the pan in inverted position, showing the extent of vertical drop imparted to the grate-bars when the pan is inverted; Fig. 11 is a view on the order of Fig. 10 showing the stationary grate-bars disposed adjacent the movable bars; Fig. 12 is a cross-sectional detail through a number of adjacently disposed movable and stationary bars showing the shearing effect of the gravitating bars on the sinter when the pan is inverted; Fig. 13 is a view similar to Fig. 12 showing a succession of movable bars having different ranges of vertical movement or drop; Fig. 14 is a top plan of three grate-bars showing the manner of alining the same across the pan; Fig. 15 is a sectional view through the side wall of the pan on the order of Fig. 9 showing a modified form of grate-bar in the shape of a channel bar, with means for dropping only one end of the bar; Fig. 16 is an enlarged side view of the fulcrum end of the bar shown in Fig. 15, parts being broken away; Fig. 17 is a vertical cross-section through a limited number of bars on the line 17—17 of Fig. 15; Fig. 18 is a section across the pan similar to Fig. 3 (with parts omitted) showing another modification of grate-bar; and Figs. 19 and 20 are cross-sections of solid bars showing further modifications, these being in the nature of variations of the cross-section of the first form described and shown in Figs. 4, 5, 12, 13, and 14.

Referring to the drawings, and for the present to Figs. 1 to 14 inclusive, 1 represents a pan or treatment vessel which in practice is preferably oblong and of any convenient size, the same terminating at the ends of its longitudinal axis in hollow trunnions 2 about which the pan may be rotated or tilted for purposes of dumping the charge, the passage-ways of the trunnions communicating with the stationary casings or boxes 3 from which lead the pipes 4 to any suitable exhauster (not shown). The intake or inner ends of the trunnion passage-ways open into the gas chamber 5 disposed under the grate and the charge $m$ supported thereon. Extending across the chamber 5 are a series of flanged tie beams 6, the ends whereof are bolted to the side walls of the pan, each beam being formed with a pair of large openings O elongated in the direction of the length of the beam to allow for a free circulation of the gases through the gas chamber to the passage-ways of the trunnions. The features above described and others shown but not alluded to, are well understood in the art and a description thereof is unnecessary, the same being in no wise concerned with the present invention. In the present embodiment of my invention each pair of beams 6 support between them a series of brackets or grate supports 7, said brackets terminating at the upper corners in suitable lobes *a, a*, that are inserted between the upper flanges of the beams and the flanges *h* surrounding the openings O, the lobes of adjacent terminals of the brackets on opposite sides of a beam being provided with lugs *a'* secured to the web of the beam by a single bolt *b* (Fig 5), it being understood that the brackets or grate supports 7 are in alinement lengthwise of the pan (Fig. 2). In the present example (Fig. 2) there are five brackets disposed across the pan between each pair of tie beams, each pair of brackets supporting between them a plurality of grate-bars, six being shown in the construction before us, making twenty-four grate-bars across the width of the pan between each pair of tie beams. The total number of grate-bars would obviously depend on the length of the pan and sizes of the individual bars, the bars (whatever be their number) forming collectively a supporting grate or perforated support for the charge.

As pointed out above, one of the objects sought is to reduce the amount of the coarse material or bedding usually interposed between the grate and the charge to be sintered, and at the same time effectively protect the grate openings or slots of the grate. To accomplish this, the grate-bar is given such a cross-section that when a number of bars are placed in juxtaposition the opposing faces of successive bars will slope toward the spaces or slots between the bars, thereby forming V-shaped grooves or channels *d* in which the coarse bedding *m'* may be concentrated, a limited depth of the material affording ample protection to the bars against adhesion thereto of the sintered, and often molten, product of the charge. In the preferred form of construction, the grate-bars 8 have the cross-section shown in Figs. 1, 4, 5, 12 and 13, the bars being substantially two truncated wedges placed back to back, the faces of the wedges converging upwardly and downwardly respectively, the bottom wedge being the longer. The adjacent edges of the faces of the respective wedges terminate at the narrow intermediate face *e*. The grate-bar terminates at one end in a head or extension 9 projecting beyond the main body of the bar, the head being extended laterally so as to form offsets *n* with the faces *e* of the bar, the opposite end of the bar being formed with corresponding offsets *n*, these offsets, when two bars are placed together serving to space the bars apart a distance equal to the depth of two offsets, the resulting slots *s* between the bars serving as grate openings for the passage of the gases through the grate. The flat bottom of the extension or head 9 lies approximately in a medial transverse plane through the bar, said bottom being adapted to rest directly on top of a bracket 7 (Fig. 3), the latter being provided with a terminally tapered stud or bolt 10 loosely received in a socket *t* formed in the head (Fig. 6). The flat top of the extension or head 9 is substantially even with the lower edge of the narrow side face *e* (Figs. 6, 9). The opposite end of the bar is transversely recessed, the resulting recess (designated by *r*) being bounded by an overhanging projection *u* on one side, and by an underhung toe-piece or lug *w* on the other side, the bottom of the overhang *u* being substantially even with the lower edge of the side face *e*. The overhang *u* of one bar rests on top of the head or extension 9 of the next bar directly supported on a bracket 7, the bracket being provided at the top with a flange *c* having a bottom inclined face from which the inclined toe-piece *w* is spaced when the bars are in their normal positions of rest. The first bar of any transverse row of alining bars whose outer end rests on a bracket 7 has its head 9 passed loosely under the side ledge member or bar 11 (Figs. 3, 9), said ledge preventing the bar from dropping away from the bracket when the pan is tilted to dumping position. With the grate bars supported in alining rows transversely across the pan as described, the tops or ridges *g* of the bars will be disposed in a horizontal plane raised above the upper longitudinal flanges of the tie beams 6; and to avoid leaving a depression between the bars on either side of and immediately adjacent to the tie-beams, I provide the latter with dummy bars 12 of a cross-section approaching that of the upper wedge of the grate-bar 8, the tops *g'* of the bars 12 being in the same plane with the tops *g* of the grate-bars 8, the whole forming a grate surface with evenly spaced bars.

It was pointed out above that one of the objects sought was to automatically remove any accretions on the grate or obstructions in the grate openings by imparting to the grate-bars a limited range of movement from their normal positions of rest with the dumping movement of the pan. It may therefore be proper at this juncture to describe the operation of the grate-bars in order to fully appreciate the virtue of the limited movement or drop to which the bars are subjected when the pan is turned about its longitudinal axis to dumping position. Referring momentarily to Fig. 3, it may be stated that the right hand side of the pan shown therein is the dumping side, the same being swung downward with the tilting of the pan, the opposite side swinging upward. The same is true of Fig. 9 which however on account of the larger scale on which it is drawn shows only two alining bars (and a fraction of a third bar.) In Fig. 9 the bars are shown in their normal positions of rest and the pan 1 in an upright position. If now we turn the pan about its longitudinal axis sufficiently to invert it, the left hand end in Fig. 9 will be on the right as shown in Fig. 10, and the bars will drop away from their normal positions of rest shown in Fig. 9, to the new positions shown in Fig. 10. In other words, the first bar of an alining row whose outer end rests with its head 9 on the bracket 7 will oscillate about the stud 10, the opposite or recessed end dropping away from the head 9 of the next bar which normally supports it, until the toe-piece $w$ thereof strikes the inclined face or wall of the flange $c$ of the second bracket 7, said wall arresting the bar against further drop. The drop of the recessed end of the first bar permits the head 9 of the next bar to fall away from its supporting bracket 7 until said head strikes the overhang $u$ of the first bar, this drop being insufficient however to withdraw the stud 10 entirely from the socket $t$ of the head. The recessed end of the second bar 8 will drop away from its support on the head 9 of the third bar until arrested by the flange $c$ of the third bracket 7, the third bar then dropping and so on through the entire series of any alining row of bars across the pan. With the exception of the first grate-bar of the series which drops only at one end, all the other bars drop at both ends, as clearly apparent from Figs. 9 and 10. It follows from this that the first bar has only half the drop of any of the other bars of the row of bars with which it is alined. This differential in the drop between the bars is rather an advantage than otherwise as presently to be seen. It is however not desirable, nor is it necessary, that the limited drop described should be imparted to all the grate bars with a dumping movement or tilting of the pan. In practice the bars of every other transverse row are preferably locked against movement or displacement as shown diagrammatically in Fig. 12. In said figure, L represents the original plane of support of the bars from which the bars of every other row have dropped, the remaining bars being held to said plane of support the same as in the ordinary grate constructions. In the present improvement the bars that are intended to be stationary or non-dropping are provided with thicker toe pieces $w'$ so as to permanently engage the flanges $c$ of the brackets 7. This prevents the overhang $u$ of one bar dropping away from the head 9 of the next bar and the bars are accordingly locked against a dropping movement as clearly shown in Fig. 11 in which the pan is shown inverted, but with the grate-bars undisturbed from their normal positions of rest. In this figure the dotted lines indicate the positions assumed by the drop of the movable bars in the row immediately behind the stationary bars. The distance through which a grate-bar can drop with a tilting of the pan to dumping position will depend on the space between the toe-piece $w$ of the bar and the flange $c$ by which it is arrested in its falling movement. A toe-piece thickened to reduce the space between it and the flange $c$ by one-half, will necessarily reduce the drop one-half, the extent of drop depending on the distance between the toe-piece and the member by which the same is arrested. Thus, in Fig. 13 is shown diagrammatically grate-bars of adjacent alining rows in which the bars of one row have a drop double the drop of the bars of adjacent rows. Whether we provide a grate in which only a part of the bars participate in a drop, or one in which all the bars drop but to different degrees as shown in Fig. 13, is immaterial, the invention contemplating broadly such a displacement of the grate-bars (or their equivalents) from their normal positions of rest with a dumping or tilting movement of the pan, as to dislodge and loosen any material tending to adhere to the grate, the displacements of the bars as described, coupled with the cross-section thereof, and the disposition of the slots $s$ and the channels $d$ leading thereto in parallelism with the plane of rotation of the pan, all tending to produce an ideal grate in that the several features alluded to operate to keep the grate clean without resort to manual labor. Referring now to Fig. 3, it will be seen from the arrows that when the dumping side of the pan is depressed the opposite side will naturally be raised. As the grate-bars sweep from the horizontal toward the vertical position with a turning of the pan, they tend to slide down toward the dumping side of the pan. The studs 10 however prevent the bars from sliding, thereby leaving the opposite recessed ends clear of the brackets 7 and permitting said ends to oscillate or drop freely and without fouling the brackets. Of course, as the pan is being tilted from a horizontal to vertical position the material on the grate will likewise tend to slide toward the dumping side of the grate; and since the grate-bars and the grooves $d$ leading to the slots separating the bars are disposed parallel to the plane of rotation or dumping plane of the pan, the weight of the sintered mass when it reaches a vertical position will have a tendency to crush and loosen any accretions adhering to the grate. The adhering material is however completely loosened from the bars by the limited drop of the bars when the pan is tilted to dumping position, the drop of the bars exerting a shearing action upon the brittle sintered and vitrified material, not only breaking it up but tearing it away from adjacent bars, this shearing action being most effective when a differential of drop exists between different bars as above described, and as shown in the drawings. Thus, in Fig. 12 it will be seen that the bars which have dropped have pried off the adhering material from adjacent bars, said material being likewise loosened from the gravitating bars. With all adhering material loosened from the bars, the entire charge of sintered material m readily dumps out of the pan. Obviously, when the pan is righted to be recharged, the gravitating bars will drop back to their original or normal positions of rest, the stud 10 guiding one end of the bar back to the grate support or bracket 7, the opposite end of the bar naturally falling back against the head 9 of the next bar on which it normally rests.

A grate-bar which drops at both ends as above described may be said to have twice the drop of one dropping only at one end which is the case with the bar of any row of bars at the end farthest removed from the dumping side of the pan (the bar at the left hand end of the row in Fig. 3 for example). The bar dropping at one end only may be said to have the minimum drop; and with some bars such a limited drop is sufficient in practice. For example, if we provide a grate-bar of substantially the same cross-section as the upper half of the bar 8, but make the same hollow or in channel form as shown in the modification in Figs. 15 to 17 inclusive, a drop at one end is sufficient. In this modification we have a bar 8' formed with a longitudinal channel A, and terminating at one end in a supporting head or extension 9', the head being formed with a socket t' terminating at its inner end in an enlargement or recess t'', the bracket 7 in that case being provided with a stud 10' terminating in a head 10'' free to pass through the socket t', and, by a slight longitudinal movement of the bar entering the recess t''. Once the head 10'' of the stud enters the recess t'' it prevents the grate-bar dropping away from its support (bracket 7) although the bar is perfectly free to oscillate at its opposite end. Since the pan is always tilted in the same direction (clockwise Fig. 3) the tilting of the pan tends to cause the bars to slide toward the dumping side of the pan (the side first depressed with a tilting movement of the pan), this tendency of the bars to slide as indicated operating to permanently keep the stud heads 10'' in the recesses t'' and hence preventing the ends of the bars carrying the extensions 9' from dropping away from their supports 7 when the pan is tilted to dumping position. The opposite or recessed ends of the channel bars carrying the toe pieces w'' are free to oscillate the same as the corresponding ends of the bars 8 first described, all the channel bars 8' however being preferably restricted to the minimum drop for the following reason: It will be seen that the channels A of the bars when installed on a pan will open directly into the gas chamber 5 traversed by the gases drawn through the charge and the perforations of the grate by the exhauster, the said gases circulating through the channels of the bars and to a considerable extent cooling the bars. Since the hollow or channeled bar is thus comparatively cooler than the solid bar, it follows that the sintered and vitrified product which reaches the bars from the charge being sintered will be correspondingly cooled and hence tend to adhere to the bars with less tenacity than would a hot mass of molten material. It follows therefore that in order to dislodge an accretion adhering to a bar which is comparatively cool, the amount of vertical displacement or drop imparted to such a bar may be considerably reduced; and it is for this reason that the hollow bars 8' may all be restricted to the minimum movement or drop. The groove (d) construction of grate is a decided advantage as the material (m) deposited thereon has a tendency to arch across the slots or openings s (Fig. 17) and thereby resist the downward suction and flow of the gases to the extent of preventing such flow driving the material into the slots and clogging the same. For this reason some material, especially such as will not readily run or become too sticky at high temperatures, may be treated directly on the grate without employing the protecting layer of inert material m', this being especially the case with the channel or hollow bar 8', on which the gases in the chamber 5 exercise a cooling effect and hence in many cases dispensing with the necessity of employing a protecting bedding for the charge. The hollow bar (in common with the solid bar) has another advantage, in that when treating material which forms a mass that does not readily break up, the high portions of the grate-bars form lines of weakness along which the mass breaks readily. In particulars not herein referred to the hollow bar is substantially similar in construction to the solid bar and since the drawings are clear further description of this bar is unnecessary.

In the construction last described the fulcrum ends of the bars in any row of bars are adjacent to the drop ends of the bars adjacent thereto in said row; but I may have the drop ends of two bars adjacent to one another. For example, in Fig. 18 is shown more or less conventionally two alining bars 8'' spanning the width of the pan 1 in which the outer ends of the bars are the fulcrum ends, the inner adjacent ends of the bars being the drop ends. In this modification the drop ends of the bars are formed with transverse recesses R loosely receiving the flanges of a central T bar 15, the supporting lug 16 of one bar resting on the T-bar, and the overhang 17 of the other bar in turn resting on the lug 16 of the first bar, with ample play between the flanges of the T-bar and the side walls of the recesses R to permit of the necessary drop of the bars when the pan is inverted, as clearly obvious from the dotted positions of the bars in said figure.

In Fig. 19 are shown cross-sections of solid bars 8$^a$ on the order of the bar first described, but in lieu of a flat ridge the modification shows the faces of the upper wedge intersecting in a sharp edge; and in Fig. 20 are shown bars 8$^b$ in which the faces of the upper wedge terminate in a rounded ridge. It is of course apparent that the bars may have various cross-sections not described without involving a departure from the nature or spirit of my invention, so long as the cross-sections are such as to result in a grate with grooves bounded by walls sloping toward the slots or openings at the bases of the grooves, and so long as these grooves are parallel to the dumping plane of the treatment vessel or pan in which the grate is installed. Grooves so disposed and with bounding walls sloping toward the slots at the bottom thereof contribute materially to the shearing action of the bars when the latter participate in the limited drop above described, with the dumping of the pan. In this connection it may be stated that when a bar drops, the ridge $g$ operates more or less as a cutting edge, the pressure due to the weight of the bar against the sintered material being exerted in two directions owing to the wedge formation of the bar, the vertical component being represented by the perpendicular of the right angled triangle of which the edge of the inclined face of the wedge is the hypotenuse, and the horizontal component being represented by the base of such triangle. Thus the sinter is crowded and torn asunder in at least two directions, and sufficiently to dislodge all accretions tending to adhere to the bars of the grate.

When the pan is in its normal or upright position, all the grate bars occupy their normal positions of rest, bringing the ridges $g$ of the bars into a common substantially horizontal plane, the succession of ridges presenting a substantially even supporting surface for the charge $m$ deposited on the grate. The moment however that the pan is inverted or tilted sufficiently to dump the sintered mass, the drop bars destroy the evenness of this surface because in falling away from their original or normal positions of rest, the ridges of the bars that have dropped will now be in a different plane from those of the bars which remained stationary (Fig. 12), or from the ridges of the bars that dropped only one-half the distance (Fig. 13). What therefore, before the drop of the bars constituted an even grate surface, becomes a distorted surface when the pan is dumped, due to the fact that the ridges of a portion of the bars are disposed in one plane, while the ridges of another portion are disposed in a different plane or planes. It follows from the foregoing that the distorting of the grate surface, or the bringing of different portions of the said surface into different planes so as to destroy the evenness of that surface with the dumping of the pan or treatment vessel, constitutes one of the features of my invention, that distortion in the present embodiment of the invention resulting from the limited drop in which the grate bars are permitted to participate with a dumping movement of the treatment vessel or pan. It is due to this distortion that the sintered mass is broken up and loosened from the bars, the distance through which the bars drop determining the extent or degree of the distortion. It is to be understood that I am not to be restricted to the specific details here shown for causing a drop of the bars with a dumping movement of the pan, the invention contemplating any suitable means for releasing the bars or equivalent grate members or sections and causing the same to drop or be sufficiently projected outwardly from their normal positions of rest to dislodge any sinter or accretions adhering thereto with a dumping movement or tilting of the pan.

Having described my invention what I claim is:

1. A grate provided with a plurality of openings, and having a succession of supports for the material disposed in a plane above said openings.

2. A grate comprising a succession of supports spaced apart, with passage-ways or opening between the supports, and provided with downwardly sloping surfaces converging toward one another and toward the passage-ways or openings aforesaid.

3. A grate of the character described, comprising a succession of individual members spaced suitable distances apart, the tops of the members forming collectively a series of supporting surfaces disposed in a plane above the spaces separating said members.

4. In a grate of the character described, a grate-bar provided with a top supporting ridge, and sides diverging downwardly from said ridge.

5. In a grate, a grate-bar terminating at either end in lateral offsets, said offsets determining the spacing between the bars.

6. In a grate, a grate-bar terminating at either end in lateral offsets, the body of the bar extending suitable distances above and below the offsets.

7. A grate comprising a succession of supports for the material spaced suitable distances apart, and provided with downwardly sloping surfaces converging toward one another between the supports.

8. A grate comprising a series of bars spaced apart, each bar being formed with a top supporting ridge, and sides diverging downwardly from said ridge toward the spaces separating the bars.

9. A grate comprising a series of bars spaced apart, each bar being formed with a top supporting ridge, and sides diverging downwardly from said ridge toward the spaces separating the bars, a portion of each bar extending below the spaces between the bars.

10. A grate of the character described, comprising a succession of bars spaced suitable distances apart, the sides of adjacent bars converging toward said spaces, the upper edges of said sides terminating in supporting ridges disposed in a plane removed a suitable distance from the spaces between the bars.

11. In combination with a treatment vessel rotatable in a given plane for dumping, a grate provided with a series of grooves disposed parallel to the plane of rotation of the vessel.

12. In combination with a treatment vessel rotatable in a given plane for dumping, a grate comprising a succession of bars spaced apart, and grooves between the bars leading to said spaces and disposed parallel to the plane of rotation of the vessel.

13. In combination with a treatment vessel rotatable in a vertical plane for dumping, a grate comprising a succession of bars spaced apart, and grooves formed by the bars and bounded by faces sloping toward the spaces between the bars, said grooves being disposed parallel to the plane of rotation of the vessel.

14. A grate of the character described, comprising a succession of channel bars spaced suitable distances apart, the sides and tops of the bars arching over the channels, the crowns of the arches forming collectively a series of supporting surfaces disposed in a plane removed from the spaces between the bars.

15. A grate comprising a succession of parallel bars provided with supporting ridges spaced apart, and with passage-ways or openings between the bars, the sides of adjacent bars sloping and converging from the ridges to the openings aforesaid, thereby forming grooves between the bars above the openings.

16. In combination with a treatment vessel, a grate presenting a substantially even surface for the support of the charge to be treated, said vessel being tiltable for dumping the charge, and means for causing a distortion of the charge-supporting surface of the grate with a dumping movement of the vessel.

17. In combination with a treatment vessel tiltable in a vertical plane about a fixed axis, a grate presenting a substantially even surface for the support of the charge to be treated, and means for causing a distortion of the charge-supporting surface of the grate with a tilting of the vessel to dumping position.

18. A grate of the character described, comprising a series of component members forming a support for the charge, and means for permitting a member to participate in a limited outward movement from its normal position of rest.

19. A grate of the character described, comprising a series of component members forming a support for the charge, and means for permitting a member to participate in a limited outward movement in a direction transverse to the supporting surface of the grate.

20. A grate of the character described, comprising a series of component members collectively presenting a normally horizontal supporting surface for the charge, and means for permitting a member to participate in a limited vertical outward movement.

21. A grate of the character described, comprising a series of component members collectively forming a support for the charge, said grate being provided with openings for the passage of gases, and means for permitting a member to participate in a limited outward movement in a direction transverse to the supporting surface of the grate.

22. A grate of the character described, comprising a series of grate-bars spaced suitable distances apart to form grate openings, means for supporting the bars, and means for permitting a predetermined number of the bars to participate in a limited outward movement in a direction transverse to the supporting surface of the grate.

23. A grate of the character described, comprising a series of parallel grate-bars and provided with suitable openings, means for supporting the bars, the grate being rotatable in a vertical plane about an axis, transverse to the general direction of the bars, and means for causing a predetermined number of the bars to participate in a limited vertical outward movement or drop with a rotation of the grate through a sufficient arc.

24. In combination with a member rotatable about a fixed axis, a grate composed of a series of bars disposed parallel to the rotation plane of said member, and supporting means for the bars permitting the bars to participate in a limited vertical outward movement or drop from their normal positions of rest with a rotation of the member through a sufficient arc.

25. In combination with a member rotatable about a fixed axis, a grate composed of a series of bars disposed parallel to the rotation plane of said member, supporting means for the bars permitting the bars to participate in a limited vertical outward movement or drop from their normal positions of rest with a sufficient rotation of the member, and means for maintaining a differential in the extent of said drop between different bars.

26. In combination with a member rotatable about a fixed substantially horizontal axis, a grate composed of a series of bars disposed parallel to the rotation plane of said member, means for supporting and holding a portion of the bars in a fixed position, and supporting means for another portion permitting the bars to participate in a limited vertical outward movement or drop from their normal positions of rest with a rotation of the member through a sufficient arc.

27. In combination with a treatment vessel mounted to rotate about a fixed horizontal axis, a grate composed of a succession of bars spaced apart and disposed parallel to the plane of rotation of the vessel, means carried by the vessel for supporting the bars, and means for causing any predetermined number of the bars to participate in a limited vertical drop from their normal positions of rest with a dumping movement or rotation of the vessel.

28. In combination with a treatment vessel mounted to rotate about a fixed horizontal axis, a grate composed of a succession of bars spaced apart and disposed parallel to the plane of rotation of the vessel, means carried by the vessel for supporting the bars, and means for causing any predetermined number of the bars to participate in a limited vertical drop at one end of the bar from their normal positions of rest at said end when the vessel is rotated to dumping position.

29. In combination with a sintering pan rotatable in a vertical plane for dumping the charge treated, supporting means positioned beneath the charge during the period of treatment, said supporting means participating in a limited downward movement to break up and dislodge any sintered material adhering thereto upon rotation of the pan to dumping position.

30. In combination with a sintering pan tiltable in a vertical plane for dumping the charge treated, a support for the charge, and means for causing said support to shift its position within suitable limits with a dumping movement of the pan, in a direction operating to release any sintered material adhering to the support.

31. In combination with a sintering pan mounted to be inverted for dumping the treated charge, a series of supports for the charge, and means for causing a predetermined portion of said supports to become displaced from their normal positions of rest with an inversion of the pan, said displacement being in a direction operating to break up and release any sintered material adhering to said supports.

32. In combination with a sintering pan tiltable in a vertical plane for purposes of dumping, a grate for supporting the charge during treatment, said grate having component parts capable of a limited vertical movement, and means coöperating with said parts to cause a vertical outward displacement thereof from their normal positions of rest with a dumping movement of the pan, thereby dislodging and breaking up any sinter adhering to the grate.

33. In combination with a grate-bar, supporting means engaging the ends of the bar, and suitable formations on the bar coöperating with the supporting means to permit the bar to participate in a limited outward vertical movement or drop with an inversion of the bar and supporting means.

34. In combination with a grate-bar, a suitable support for the bar, and coöperating means between the bar and its support for causing the bar to drop a certain distance with an inversion of the bar and its support.

35. In combination with a grate-bar, suitable supports for the ends of the bar, and coöperating means between the bar and its supports for causing either end of the bar to drop a certain distance with an inversion of the bar and its supports.

36. In combination with a grate-bar, suitable supports for the ends of the bar normally extending below the bar, and coöperating means between the bar and its supports for causing the bar to drop at either end through a limited vertical distance with an inversion of the bar and its supports.

37. In combination with a series of supports, an alined row of grate bars resting with one end on the supports, the opposite ends being supported by the adjacent ends of succeeding bars and having their upper supporting surfaces disposed in a common plane, and means for permitting the bars to participate in a limited vertical drop with an inverting movement of the supports and bars.

38. In combination with a sintering pan mounted to be inverted for dumping the treated charge, supporting means positioned beneath the charge during the period of treatment, said supporting means participating at different points in a limited downward movement to break up and dislodge any sintered material adhering thereto, upon the tilting of the pan to dumping position.

39. In combination with a tiltable treatment vessel, a grate member positioned to support the charge and being at rest during the treatment of the charge, and means for causing said member to drop through a limited distance away from its normal position of rest, with a dumping movement of the vessel.

40. In combination with a tiltable treatment vessel, a perforated support for the charge, and means for causing different portions of said support to drop through a limited distance away from their original positions of rest with a dumping movement of the vessel.

41. In combination with a tiltable sintering pan, a grate comprising a plurality of independent members for supporting the charge, and means for causing a portion of the members to participate in a limited downward displacement from their original supporting positions with a dumping movement of the pan.

42. In combination with an open top sintering pan rotatable about a fixed axis for dumping, a grate comprising a plurality of bars spaced apart and collectively presenting an even supporting surface to the charge resting thereon, and means for causing a portion of the bars to participate in a limited drop with a dumping movement of the pan.

43. In combination with an open top sintering pan tiltable for dumping, a grate comprising a plurality of bars capable of limited outward displacement from their normal positions of rest while supporting the charge, and means for imparting a differential of displacement to different bars with a dumping movement of the pan.

44. In a treatment vessel, a perforated support for the charge comprising a plurality of members capable of limited outward displacement in a direction transverse to the normal charge-supporting surface formed by the members collectively, and means for causing a differential of such displacement between the members with a dumping movement of the vessel.

45. In a tiltable treatment vessel, a grate comprising a plurality of members spaced apart, and means for imparting to any predetermined number of the members a limited outward displacement in a direction transverse to the charge-supporting surface of the grate with a dumping movement of the vessel.

46. In a tiltable treatment vessel, a grate composed of a plurality of members disposed parallel to the tilting plane of the vessel, and means for imparting to any predetermined number of the members a limited outward displacement or drop in a direction transverse to the charge-supporting surface of the grate with a tilting movement of the vessel.

47. In combination with a treatment vessel tiltable in a vertical plane, a grate member participating in a limited outward movement or drop with a tilting of the vessel to dumping position.

48. In combination with a treatment vessel tiltable for dumping, a series of grate supports disposed across the vessel, an alining row of grate-bars having each a formation at one end resting directly on a grate support, the opposite end of the bar being transversely recessed to form an overhang normally resting on the supported terminal formation of an adjacent bar and an underhung portion or toe-piece spaced from the grate support, means on the grate support for arresting the toe-piece with a dumping movement of the vessel, and a loose stud-and-socket connection between the grate support and the end of the bar directly resting thereon, for the purpose set forth.

49. In combination with a tiltable treatment vessel, a grate comprising a series of component members forming a support for the charge, and means for causing a member to participate in a limited outward movement from its normal position of rest with a tilting of the vessel to dumping position.

In testimony whereof I affix my signature, in presence of two witnesses.

JOHN E. GREENAWALT.

Witnesses:
KATHERINE SCUDDER,
W. E. UNGARLEIDER.